Figure 1:
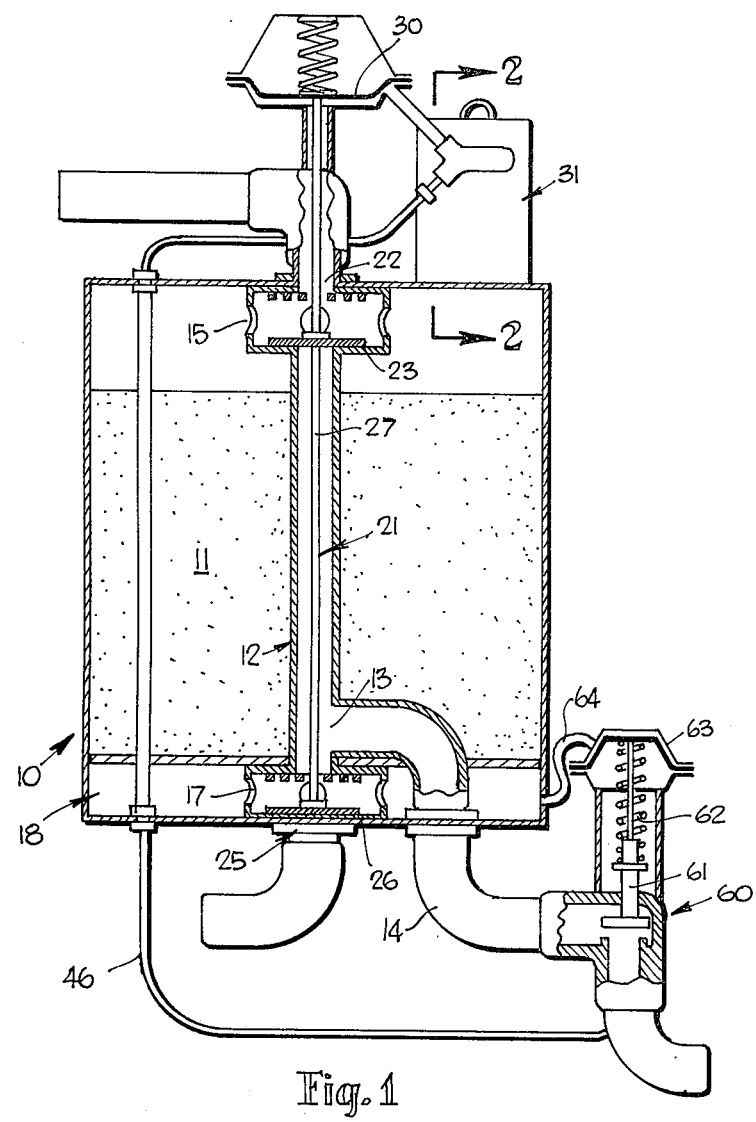

United States Patent [19]
Tucker

[11] 3,948,773
[45] Apr. 6, 1976

[54] AUTOMATIC CONTROL FOR FILTERING EQUIPMENT UNDER PRESSURE

[76] Inventor: Alfred Denholm Tucker, Box 531, Berri, Austria, 5343

[22] Filed: June 13, 1974

[21] Appl. No.: 478,964

[52] U.S. Cl.................................. 210/108; 210/128
[51] Int. Cl.² ........................................ B01D 29/38
[58] Field of Search............................ 210/108, 128

[56] References Cited
UNITED STATES PATENTS

| | | | |
|---|---|---|---|
| 1,252,099 | 1/1918 | Donovan.......................... | 210/128 X |
| 3,432,005 | 3/1969 | Gates............................... | 210/108 X |
| 3,616,915 | 11/1971 | Whitlock........................... | 210/108 |

*Primary Examiner*—John Adee
*Attorney, Agent, or Firm*—Jay L. Chaskin

[57] ABSTRACT

Filter backwash means for automatically backwashing a filter when increase of pressure indicates that the filter is starting to block, wherein a reversing valve is arranged to reverse water flow through the filter to wash out the blocking particles (mud and the like) to drain, the reversing mechanism comprising a pressure responsive means coupled to an actuating means in turn coupled to the reversing valve, and a float valve actuated latch to actuate the reversing mechanism.

6 Claims, 2 Drawing Figures

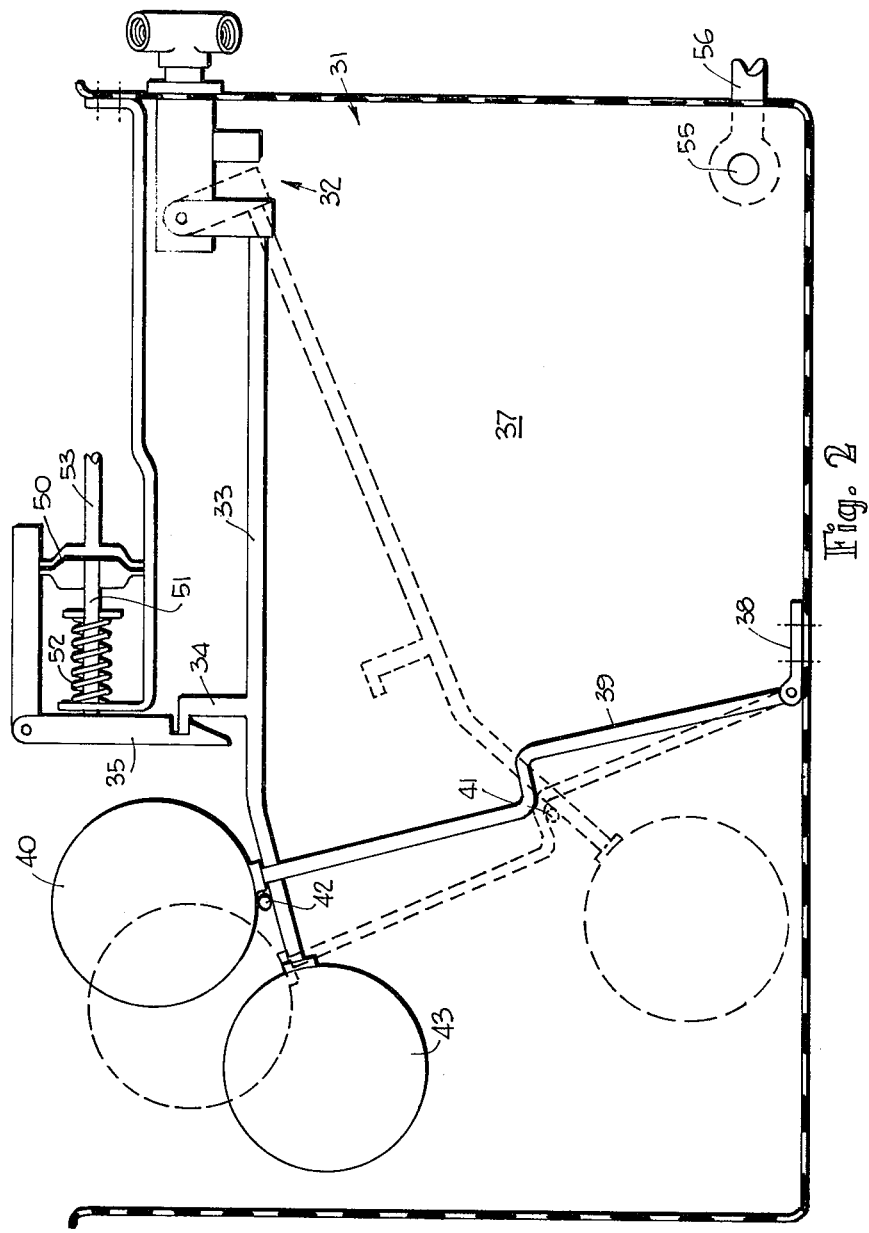

AUTOMATIC CONTROL FOR FILTERING EQUIPMENT UNDER PRESSURE

This invention relates to a means and method for backwashing the filter bed of a filter.

It has long been desired to devise a filter backwash means which will operate automatically and without the use of pumps and without the use of valves requiring either manual operation or control. This would keep the operating cost at a reasonable level, but it has been difficult to devise an automatic backwash wherein the maintenance cost is low.

For agricultural purposes, a simple automatic filter backwash means would be most advantageous, especially when used in connection with drip irrigation. Drip irrigation is coming more and more into use, but drip irrigation is associated with a series of problems. One such problem is the blockage of the "dripper" mechanism with particles of slime and grit. As the term "drip irrigation" implies, irrigation is achieved by a dripping action and the dripper mechanism is such that blockages may easily occur in the dripper outlet. This may to a certain extent be overcome by using a filter at various positions in the irrigation system. However, filters themselves are prone to become clogged with slime and grit, especially when using river water, and hence the filtering unit becomes of little use. By backwashing the filter bed of a filter unit and establishing a reverse flow of liquid therethrough, a desirable cleaning action of the filter bed is produced. Time spent on cleaning and adjusting each dripper tap is thereby considerably reduced.

It is an object of this invention therefore, to provide a means and method whereby reverse flow of liquids through the filter bed and the necessary backwashing action is accomplished without necessarily requiring manual operation of a pump or valve.

It is a further object of this invention to provide a filter backwash means which is automatic and operates whenever the situation demands, that is whenever the filter bed becomes blocked with foreign particles.

In accordance with this invention, filter backwash for a filter having a filter bed comprises a reversing valve having a valve operating member which in one position allows liquid to flow through the filter bed from its inlet end to its outlet end and in another position allows liquid to flow in the reverse direction for backwash of the filter bed, pressure responsive means operatively connected to the valve member, and actuating means operatively coupled to said pressure responsive means, operable upon pressure build-up at the filter bed inlet end to actuate the pressure responsive means, in turn effecting movement of the valve member from said position of flow from the inlet end to the outlet end to said position of flow for backwash.

An embodiment of the invention is described hereunder in some detail with reference to, and is illustrated in, the accompanying drawings, in which FIG. 1 is a section through a filter, and FIG. 2 is a section on line 2—2 of FIG. 1, but drawn to an enlarged scale.

According to this embodiment, a filter 10 is provided with a filter bed 11 of particulate material, and contains a reversing valve 12 having an inlet opening 13 in fluid flow communication with an inlet conduit 14, a first valve outlet opening 15 at the inlet end of the filter bed 11, and a second outlet valve opening 17 at the outlet, or lower end 18 of the filter bed 11. The valve 12 contains a valve member generally designated 21, described in more detail below, but arranged in its up position to allow water to flow from the inlet conduit 14 into the inlet end 16 of the filter 10, through the bed 11, and outwardly through the outlet end 18 of the filter. When the valve member 21 is in its down position, water flows in a reverse direction through bed 11 for backwashing the bed.

The inlet end 14 of the filter 10 is provided with a drain opening 22, and as shown in the drawing, the upper closure plate 23 of the valve member 21 functions as closure means for closing the drain opening 22 when there is "normal" flow through bed 11. Further, as shown in the drawing, the outlet end 18 of the filter 10 is provided with an outlet opening 25, arranged to be closed by the lower closure plate 26 of the valve member 21, upon backwash of the bed 11.

The plates 23 and 26 are spaced on a valve spindle 27 itself coupled to a spring loaded pressure responsive diaphragm, in turn actuated by actuating means generally designated 31, and shown in detail in FIG. 2. The actuating means 31 functions upon pressure build-up at the inlet end 16 of the filter 10, as described herebelow. Pressure build-up occurs gradually, but is a function of the degree of blockage of the filter bed 11 by grit, mud, slime or other solid or semi-solid substances.

Referring now more particularly to FIG. 2, the actuating means 31 comprises a float valve generally designated 32 having a float arm 33 with an upstanding catch 34 arranged to engage a latch 35 when the arm is in its raised position. The valve 32 discharges into a cistern 37, and the floor of the cistern 37 has secured to it a hinge 38 supporting a second float arm 39 carrying a float 40 on its upper end. The float arm 39 however is provided with a double bend 41, the double bend 41 being arranged to engage a pin 42 on the first float arm adjacent the float 43 thereof only when the first float arm is in its down position as shown dotted in FIG. 2.

The float valve 32 draws its supply of pressure water from the inlet conduit 14 through a branch line designated 46 which is a coupling conduit in communication with the space beneath the diaphragm 30 coupled to the valve member 21 so that the diaphragm 30 normally holds the valve in its position for normal flow.

However, the actuating means 31 comprises also a pressure responsive diaphragm 50 coupled through a spindle 51 to the latch 35, the diaphragm being loaded with a spring 52 and receiving its pressure fluid through conduit 53 which is connected to the inlet end of the filter 10 (this connection not being illustrated herein). The lower end of the cistern 37 is provided with a drain opening 55 which is in communication with a drain tube 56.

When the pressure builds up in the inlet end 16 of the filter 10, the diaphragm 50 moves the spindle 51 against spring 52 until the latch 35 releases catch 34, and the weight of the float 43 lowers the first arm 33 into the empty cistern 37. The double bend 41 engages over pin 42 as the second arm also drops, and this retains the first arm 33 in its down position. In this position the water flows into the cistern 37 through the flow valve 32 at a faster rate than it drains outwardly through the opening 55 and the cistern gradually fills. However, while this takes place water flows through the inlet opening 13, through the outlet opening 17 of the reversing valve, upwardly through the filter bed 11, through the further openings 15 and 22 to drain, thereby backwashing the filter bed. Due to the water flow through the flow valve 32 there is only a very low pressure applied to the pressure responsive diaphragm 30 and the spring which co-operates with that diaphragm retains the reversing valve in its backwash position. However when the cistern fills to the point that the float 40 is lifted sufficiently to release float arm 33, the float arm 33 rises very rapidly under the influence of float 43 and valve 32 closes quickly, whereby the pressure responsive diaphragm 30 quickly has liquid at full pressure applied to it, compressing its spring and returning the reversing valve member 21 to its normal position. In the normal position the flow is from inlet conduit 14, through inlet opening 13, outwardly through the first outlet openings 15, downwardly through filter bed 11, through the second outlet opening 17 and then through the filter outlet opening 25.

In order to absorb sudden shocks which may occur in the supply pressure the device is provided with a flow regulating valve 60 which contains a flow restrictor member 61 urged upwardly by a spring 62 against diaphragm 63 which is in fluid flow communication with the outlet end 18 of the filter by means of a conduit 64.

Thus, with the gate valve open, liquid enters the inlet conduit, passes through another conduit in which is placed a reversing valve and from there to the filter unit, where the liquid travels through a filter bed of sand or other particulate filtering material. Filtered liquid leaves the filter through the outlet end of the filter, and thence is drawn through the outlet conduit ready for use.

During the normal filtration process, the reversing valve is positioned so that the liquid may flow in a forward direction through the filter, that is from the inlet conduit to the filter unit and from there to the outlet conduit.

The reversing valve comprises two valve members, connected by an interconnecting rod which may move vertically upwards or vertically downwards, each valve member having an upper and lower valve seat. In normal operation, each valve member firmly abuts its upper valve seat enabling liquid to flow under pressure as described previously. The valve member should be fairly resilient so as to give a fluid tight fitting with its seat.

At such time as backwashing of the filter is required, as indicated by a build-up of pressure at the inlet end of the filter due to clogging of the filter bed, the interconnecting rod connecting the two valve members, drops, each valve member firmly abuts its lower valve seat, and the flow of liquid through the filter is reversed. Backwashing has now commenced.

The reversal of liquid flow through the filter is achieved by means of a pressure responsive latch release mechanism, operatively connected to the reversing valve. The release mechanism consists of a latch diaphragm having a branch line connected to the inlet end of the filter unit, a retaining latch held in position by a spring, a bucket and bucket lever, and a connecting arm, operatively connecting the bucket lever to the interconnecting rod of the reversing valve.

Thus, when the filter bed becomes blocked with grit and particles of dirt, there is a build-up of pressure at the inlet end of the filter, the latch diaphragm distends, the retaining latch is released, the bucket lever together with the bucket swings upwardly about a pivot, the movement of said lever being controlled by a bucket lever spring attached to the lever and the interconnecting rod of the reversing valve. This action causes the reversing valve to assume its backwashing position whereby the liquid flow direction through the filter is reversed. This enables liquid to be discharged through the discharge conduit.

On travelling through the filter bed, the reverse flow of liquid dislodges dirt and other matter collected in the bed or upon the bed support screen and such material is carried off through the inlet end of the filter into the discharge conduit.

A portion of the backwashing liquid however, passes through a by-pass pipe which is in fluid flow communication with the discharge conduit, and enters the bucket, held in its upward position by means of magnetic forces of attraction between the bucket lever and a horse-shoe magnet. As soon as there is enough backwashing liquid in the bucket to break the magnetic attraction existing between the magnet and the lever, the bucket falls to its original latched position, its movement again being controlled by the bucket lever spring and the interconnecting rod of the reversing valve. The bucket is provided with a bleed hole which enables the backwashing liquid to gradually discharge therefrom. The backwashing operation is now completed.

The invention is not of course limited to the details of the abovementioned embodiment. One variation which may lie within the ambit of the invention includes hydraulic means for operatively connecting the bucket lever to the interconnecting rod of the reversing valve.

Alternatively, a pulley system may be employed to raise and lower the bucket.

A brief consideration of the above embodiment will indicate that the invention provides an excellent means for backwashing a filter, simple to construct and low in cost.

I claim:
1. Filter backwash means for a filter having a filter bed comprising
   a reversing valve having a valve operating member which in one position allows liquid to flow through the filter bed from its inlet end to its outlet end and in another position allows liquid to flow in the reverse direction for backwash of the filter bed,
   a pressure responsive diaphragm operatively connected to the valve member, a spring urging the diaphragm in one direction
   actuating means operatively coupled by a coupling conduit to said pressure responsive diaphragm to actuate the pressure responsive diaphragm upon pressure build-up at the inlet end to in turn effect movement of the valve member from said position of flow from the inlet end to the outlet end, to said position of flow for backwash,
   said actuating means comprises a cistern, a drain outlet opening in the cistern near its base, a float valve within the cistern, a supply conduit extending to the float valve and arranged to supply water at pressure thereto at a rate which exceeds the rate of drain from the cistern, said supply conduit being in direct fluid flow communication with said coupling conduit, the arrangement being such that upon water discharge from the float valve, the pressure within said coupling conduit reduces and the force action on said pressure responsive diaphragm reduces to be less than the force of the spring, but upon cessation of discharge the pressure force exceeds the spring force, thereby effecting movement of said valve member.

2. Filter backwash means according to claim 1 wherein said valve member comprises an axially movable valve spindle, a pair of spaced closure plates carried by the valve spindle co-operable with respective valve seats when in respective said positions, said drain and filter outlet openings being axially aligned with, adjacent to but spaced from respective said valve seats, said closure plates being co-operable with respective said openings and constituting said closure means.

3. Filter backwash means according to claim 2 wherein said valve outlet openings extend through the valve walls respectively between said drain opening and its adjacent said valve seat, and said filter outlet and its adjacent said valve seat.

4. Filter backwash means according to claim 1 wherein said actuating means further comprises a latch hinged in the cistern, means on the float valve arm engageable with the latch to retain the float valve arm in a position wherein said float valve is closed, a pressure responsive latch diaphragm coupled to the latch, and a conduit extending between said inlet end and the latch diaphragm.

5. Filter backwash means according to claim 4 wherein said valve outlet openings extend through the valve walls respectively between said drain opening and its adjacent valve seat, and said filter outlet and its adjacent valve seat.

6. Filter backwash means for a filter having a filter bed, comprising, a reversing valve having an inlet opening and at least two valve outlet openings in communication with respective ends of the filter bed, a valve member which in one position allows liquid flow through the filter bed from its inlet to its outlet end and in another, backwash position allows liquid flow through the bed in a reverse direction, the filter having a filter drain opening at said inlet end and a filter outlet opening at said outlet end, and closure means for selectively closing said openings, pressure responsive means operatively coupled to the valve member and the closure means, actuating means operatively coupled to said pressure responsive means, said actuating means comprising a cistern, a drain outlet in the cistern near its base, a float valve within the cistern, a supply conduit extending to the float valve and arranged to supply water at pressure thereto at a rate which exceeds the rate of drain from the cistern, said supply conduit being in direct fluid flow communication with said coupling conduit, a latch hinged in the cistern, means on the float valve arm engageable with the latch to retain the float valve arm in a position wherein said float valve arm is closed, a pressure responsive latch diaphragm coupled to the latch, and a conduit extending between said inlet end and the latch diaphragm, a second float arm hinged to the cistern and having means thereon which engage the first said float arm when said float valve is open but discharge the first said float arm when rising water level within the cistern lifts the second said float, the arrangement being such that upon water discharge from the float valve the force due to pressure acting on said pressure responsive diaphragm is less than the force of the spring, but upon cessation of discharge the pressure force exceeds the spring force thereby moving said valve member.

\* \* \* \* \*